United States Patent
Sakoh et al.

(10) Patent No.: US 10,093,773 B2
(45) Date of Patent: *Oct. 9, 2018

(54) FLUOROPOLYETHER-CONTAINING POLYMER-MODIFIED SILANE, SURFACE TREATING AGENT, AND ARTICLE

(71) Applicant: Shin-Etsu Chemical Co., Ltd., Tokyo (JP)

(72) Inventors: Ryusuke Sakoh, Annaka (JP); Takashi Matsuda, Annaka (JP); Yuji Yamane, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 332 days.

This patent is subject to a terminal disclaimer.

(21) Appl. No.: 14/661,557

(22) Filed: Mar. 18, 2015

(65) Prior Publication Data

US 2015/0274889 A1    Oct. 1, 2015

(30) Foreign Application Priority Data

Mar. 31, 2014 (JP) .................................. 2014-074213
Dec. 11, 2014 (JP) .................................. 2014-250460

(51) Int. Cl.

| C08G 65/00 | (2006.01) |
| G02B 1/18 | (2015.01) |
| C03C 17/30 | (2006.01) |
| C09D 171/00 | (2006.01) |
| C08G 65/336 | (2006.01) |

(52) U.S. Cl.
CPC ............ *C08G 65/007* (2013.01); *C03C 17/30* (2013.01); *C08G 65/336* (2013.01); *C09D 171/00* (2013.01); *G02B 1/18* (2015.01); *C08L 2205/02* (2013.01); *Y10T 428/315* (2015.01); *Y10T 428/31612* (2015.04); *Y10T 428/31663* (2015.04)

(58) Field of Classification Search
CPC .................................................. C08G 65/007
See application file for complete search history.

(56) References Cited

U.S. PATENT DOCUMENTS

| 4,818,619 A * | 4/1989 | Strepparola ............. C08K 9/04 428/421 |
| 4,927,950 A * | 5/1990 | Hisamoto ............... C07F 7/182 549/215 |
| 8,815,325 B2 * | 8/2014 | David ................... C23C 16/325 128/203.12 |
| 8,900,711 B2 * | 12/2014 | Yamane ............... C08G 65/007 428/421 |
| 9,644,115 B2 * | 5/2017 | Yamane .................. C03C 17/30 |
| 2006/0147722 A1 * | 7/2006 | Ohashi ....................... C08F 8/00 428/421 |
| 2011/0318679 A1 * | 12/2011 | Wu ......................... G03G 5/043 430/58.8 |
| 2012/0077041 A1 * | 3/2012 | Yamane ............... C08G 65/007 428/421 |
| 2013/0201635 A1 * | 8/2013 | Xu ............................. B32B 7/12 361/748 |
| 2015/0275035 A1 * | 10/2015 | Yamane ............... C08G 65/336 428/429 |

FOREIGN PATENT DOCUMENTS

WO    WO2016101185    * 6/2016

* cited by examiner

*Primary Examiner* — Irina Krylova
(74) *Attorney, Agent, or Firm* — Oblon, McClelland, Maier & Neustadt, L.L.P.

(57) ABSTRACT

A fluoropolyether-containing polymer-modified silane having (1) is provided wherein Rf is a fluorooxyalkyl or fluorooxyalkylene-containing polymer residue, Y is a divalent to hexavalent hydrocarbon group, R is $C_1$-$C_4$ alkyl or phenyl, X is a hydrolyzable group, n is an integer of 1 to 3, m is an integer of 1 to 5, and α is 1 or 2. A surface treating agent comprising the silane or partial hydrolytic condensate thereof cures under mild conditions into a water/oil repellent layer having abrasion resistance, weatherability and low dynamic friction.

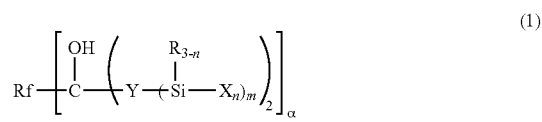

15 Claims, No Drawings

FLUOROPOLYETHER-CONTAINING POLYMER-MODIFIED SILANE, SURFACE TREATING AGENT, AND ARTICLE

CROSS-REFERENCE TO RELATED APPLICATION

This non-provisional application claims priority under 35 U.S.C. § 119(a) on Patent Application Nos. 2014-074213 and 2014-250460 filed in Japan on Mar. 31, 2014 and Dec. 11, 2014, respectively, the entire contents of which are hereby incorporated by reference.

TECHNICAL FIELD

This invention relates to a silane modified with a fluoropolyether-containing polymer, and more particularly, to a fluoropolyether-containing polymer-modified silane capable of forming a coating having water/oil repellency and weatherability, a surface treating agent comprising the modified silane and/or a partial hydrolytic condensate thereof, and an article treated with the surface treating agent.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an increasing need for technology to attain fingerprint proofness or easy stain removal on a display surface for better appearance or visibility. It is thus desired to have a material capable of meeting these requirements. In particular, for touch panel displays which are readily stained with fingerprints, it is desirable to form a water/oil repellent layer on their surface. Prior art water/oil repellent layers have high water/oil repellency and easy stain wipe-off, but suffer from the problem that the antifouling performance deteriorates during service. One of the factors accounting for deterioration of antifouling performance is a lack of weather resistance.

Generally, fluoropolyether-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. As the hydrolyzable silyl groups form chemical and physical bonds with the surface of glass or metal, the coating becomes a tough coating having durability.

Patent Documents 1 to 8 disclose a composition predominantly comprising a fluoropolyether-containing polymer-modified silane which is obtained by introducing a hydrolyzable silyl group into a fluoropolyether-containing compound, the composition being tightly adherent to the substrate surface and capable of forming a coating with water/oil repellency, chemical resistance, lubricity, parting, antifouling and other properties.

Lenses and antireflective coatings, when treated with the fluoropolyether-containing polymer-modified silane, are improved in lubricity, parting property and abrasion resistance, but lack weather resistance.

When substrates are surface treated with compositions comprising fluoropolyether-containing polymer-modified silanes, any of various coating techniques may be used to form a coating on the surface. In the subsequent step of curing the coating as applied via hydrolysis of hydrolyzable silyl groups, the hydrolysis reaction is typically accelerated at elevated temperatures of 80° C. to 120° C. or under humid conditions. Even at room temperature, hydrolyzable silyl groups slowly react with airborne moisture until a cured film is formed. Since the curing step requires hot humid conditions or the curing step at room temperature takes a time, the curing step can be a rate-determining or retarding factor for the manufacture process. Additionally, a coating (or water/oil repellent layer) which is cured under mild conditions, such as room temperature, in a short time has poor abrasion resistance and weatherability and its antifouling performance degrades during service.

Patent Document 9 discloses a coating composition to which fluorinated carboxylic acid is added as curing catalyst to accelerate cure so that a coating may be completed under mild conditions in a short time. However, abrasion resistance is adversely affected if the catalyst amount is reduced, and initial performance deteriorates if the catalyst amount is increased. There is a possibility that the carboxyl groups which are polar groups emerge on the outermost surface of the coating. If so, the coating does not perform well.

It is known to add a catalyst to accelerate hydrolysis reaction of alkoxysilyl groups. Prior art well-known catalysts include organotitanates such as tetrabutyl titanate and tetraisopropyl titanate; organotitanium chelate compounds such as titanium diisopropoxybis(ethyl acetoacetate) and titanium diisopropoxybis(methyl acetoacetate); organoaluminum compounds such as tris(acetylacetonato)aluminum and aluminum tris(ethyl acetoacetate); organozirconium compounds such as tetra(acetylacetonato)zirconium and zirconium tetrabutyrate; organotin compounds such as dibutyltin dioctoate, dibutyltin dilaurate, dibutyltin di(2-ethyl hexanoate), dioctyltin dilaurate, dioctyltin diacetate, and dioctyltin dioctoate; metal salts of organic carboxylic acids such as tin naphthenate, tin oleate, tin butyrate, cobalt naphthenate, and zinc stearate; amine compounds and salts thereof such as hexylamine and dodecylamine phosphate; quaternary ammonium salts such as benzyl triethylammonium acetate; alkali metal salts of lower fatty acids such as potassium acetate; dialkylhydroxylamines such as dimethylhydroxylamine and diethylhydroxylamine; guanidyl-containing organosilicon compounds such as tetramethylguanidylpropyltrimethoxysilane; organic acids such as acetic acid and methanesulfonic acid; and inorganic acids such as hydrochloric acid and sulfuric acid. Regrettably, since these catalysts are not dissolved in fluorochemical solvents or even if soluble, only little dissolved, catalyst efficiency is low. In some cases, the metal value is left in the cured coating, adversely affecting the properties thereof.

CITATION LIST

Patent Document 1: JP-A 2003-238577
Patent Document 2: JP 2860979
Patent Document 3: JP 4672095
Patent Document 4: JP-A 2008-534696
Patent Document 5: JP-A 2008-537557
Patent Document 6: JP-A 2012-072272
(U.S. Pat. No. 8,900,711, EP 2436716)
Patent Document 7: JP-A 2012-157856
Patent Document 8: JP-A 2013-136833
Patent Document 9: JP-A 2008-144144
(U.S. Pat. No. 7,847,015, EP 1923434)

DISCLOSURE OF INVENTION

An object of the invention is to provide a fluoropolyether-containing polymer-modified silane capable of curing under mild conditions, typically room temperature, in a short time into a water/oil repellent layer having abrasion resistance, weatherability, and low dynamic friction; a surface treating agent comprising the fluoropolyether-containing polymer-modified silane and/or a partial hydrolytic condensate thereof; and an article treated with the surface treating agent.

The inventors have found that a surface treating agent comprising a fluoropolyether-containing polymer-modified silane which is analogous to the fluoropolyether-containing polymer-modified silane mentioned above, but uses an ether bond-free linker as the linker between the fluoropolyether group and the hydrolyzable silyl group is capable of forming a water/oil repellent layer having weatherability. This surface treating agent may be cured under mild conditions, typically room temperature, in a short time into a water/oil repellent layer having abrasion resistance, weatherability, and low dynamic friction.

In one aspect, the invention provides a fluoropolyether-containing polymer-modified silane having the general formula (1).

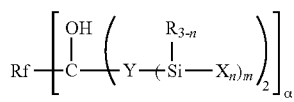

(1)

Herein Rf is a monovalent fluorooxyalkyl or divalent fluorooxyalkylene-containing polymer residue, Y is a divalent to hexavalent hydrocarbon group which may contain a siloxane bond or silylene group, R is independently an alkyl group of 1 to 4 carbon atoms or phenyl group, X is independently a hydrolyzable group, n is an integer of 1 to 3, m is an integer of 1 to 5, and α is 1 or 2.

In a preferred embodiment, α is 1, and Rf is a group having the general formula (2).

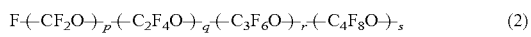

(2)

Herein p, q, r and s are each independently an integer of 0 to 200, the sum p+q+r+s is 3 to 200, each repeating unit may be linear or branched, and individual repeating units may be randomly arranged.

In another preferred embodiment, α is 2, and Rf is a group having the general formula (3).

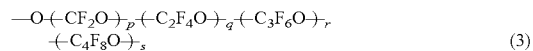

(3)

Herein p, q, r and s are each independently an integer of 0 to 200, the sum p+q+r+s is 3 to 200, each repeating unit may be linear or branched, and individual repeating units may be randomly arranged.

In a preferred embodiment, Y is selected from among an alkylene group of 3 to 10 carbon atoms, a phenylene-containing alkylene group, a divalent group having alkylene groups bonded via a silalkylene or silarylene structure, and a divalent to tetravalent group having alkylene groups bonded to a divalent to tetravalent, linear, branched or cyclic organopolysiloxane residue of 2 to 10 silicon atoms.

In a preferred embodiment, X is selected from among a $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

In another aspect, the invention provides a surface treating agent comprising a fluoropolyether-containing polymer having both an active hydrogen-containing functional group and a hydrolyzable group and/or a partial hydrolytic condensate thereof.

In a preferred embodiment, the fluoropolyether-containing polymer having both an active hydrogen-containing functional group and a hydrolyzable group is the fluoropolyether-containing polymer-modified silane defined above.

In a preferred embodiment, the surface treating agent may further comprise a fluoropolyether-containing polymer having the general formula (4):

(4)

wherein A is a monovalent fluorinated group terminated with —$CF_3$ radical, and Rf' is a divalent fluorooxyalkylene-containing polymer residue.

Also contemplated herein is an article which is surface treated with the surface treating agent defined above. Typical of the article are an optical article, touch panel, antireflective film, $SiO_2$-deposited glass, strengthened glass, sapphire glass, and quartz substrate, which are surface treated with the surface treating agent defined above.

ADVANTAGEOUS EFFECTS OF INVENTION

The surface treating agent comprising a fluoropolyether-containing polymer-modified silane and/or partial hydrolytic condensate thereof according to the invention forms a coating having high water/oil repellency. Even when the coating is cured under mild conditions, typically room temperature, in a short time, it exhibits abrasion resistance, weatherability, and low dynamic friction. By treating with the surface treating agent and briefly curing under mild conditions, a variety of articles are endowed with excellent water/oil repellency, low dynamic friction, abrasion resistance, and weatherability. The treated articles become highly resistant to UV and maintain antifouling performance over a long term.

DESCRIPTION OF PREFERRED EMBODIMENTS

The notation (Cn-Cm) means a group containing from n to m carbon atoms per group. Me stands for methyl, and Ph for phenyl.

The fluoropolyether-containing polymer-modified silane of the invention has the general formula (1).

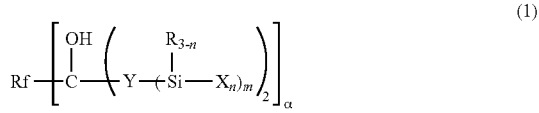
(1)

Herein Rf is a monovalent fluorooxyalkyl or divalent fluorooxyalkylene-containing polymer residue, Y is a divalent to hexavalent hydrocarbon group which may contain a siloxane bond or silylene group, R is independently a $C_1$-$C_4$ alkyl group or phenyl group, X is independently a hydrolyzable group, n is an integer of 1 to 3, m is an integer of 1 to 5, and α is 1 or 2.

The fluoropolyether-containing polymer-modified silane of the invention is characterized by the structure that the monovalent fluorooxyalkyl or divalent fluorooxyalkylene-containing polymer residue (Rf) is linked to the hydrolyzable silyl group ($-Si(R)_{3-n}(X)_n$), typically alkoxysilyl, via the hydrocarbon chain (Y). It is improved in weatherability over the structure that the fluorooxyalkyl or fluorooxyalkylene-containing polymer residue (Rf) is linked to the hydrolyzable silyl group ($-Si(R)_{3-n}(X)_n$), typically alkoxysilyl, via an ether bond, $-CF_2-CONH-$ bond, or $-CF_2-CONPh-CH_2-$ bond. The fluoropolyether-containing polymer-modified silane does not contain a hydrocarbon ether chain in the linker, which accounts for improved abrasion resistance and weatherability.

In one preferred embodiment wherein α is 1, Rf is a monovalent fluorooxyalkyl group having the general formula (2):

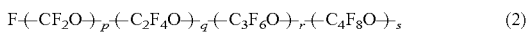
(2)

wherein p, q, r and s are each independently an integer of 0 to 200, the sum p+q+r+s is 3 to 200, each repeating unit may be linear or branched, and individual repeating units may be randomly arranged.

In another preferred embodiment wherein α is 2, Rf is a divalent fluorooxyalkylene group having the general formula (3):

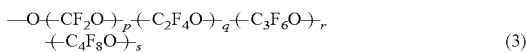
(3)

wherein p, q, r and s are each independently an integer of 0 to 200, the sum p+q+r+s is 3 to 200, each repeating unit may be linear or branched, and individual repeating units may be randomly arranged.

In formulae (2) and (3), p, q, r and s are each independently an integer of 0 to 200, preferably p is an integer of 5 to 100, q is an integer of 5 to 100, r is an integer of 0 to 100, and s is an integer of 0 to 100. The sum p+q+r+s is 3 to 200, preferably 10 to 100. Each repeating unit may be linear or branched, and individual repeating units may be randomly arranged. More preferably, p+q is an integer of 15 to 60, and r=s=0. If p+q+r+s is below the upper limit, adhesion and cure are satisfactory. If p+q+r+s is above the lower limit, the characteristics of fluoropolyether group are fully exerted.

The repeating unit-containing group Rf having a backbone structure of formula (2) or (3) ensures to form a cured film with a low coefficient of dynamic friction.

Also, the linear polymer having a fluoropolyether structure backbone and terminated with a hydrolyzable group at one end of the molecular chain (wherein α is 1 and Rf is a monovalent fluorooxyalkyl group of formula (2)) is effective for endowing the film with abrasion resistance, as compared with the linear polymer terminated with a hydrolyzable group at each end of the molecular chain (wherein α is 2 and Rf is a divalent fluorooxyalkylene group of formula (3)).

Examples of Rf are shown below.

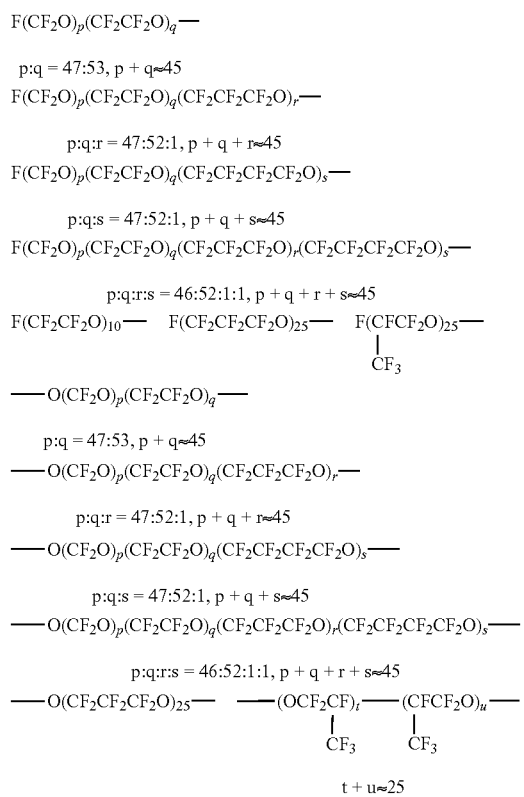

Herein, p, q, r and s are as defined above, t is an integer of 1 to 24, u is an integer of 1 to 24, t+u=r, and individual repeating units may be randomly arranged.

In formula (1), Y is a hydrocarbon group which is di-to hexavalent, preferably di- to tetravalent, and most preferably divalent, and which may contain a siloxane bond or silylene group. Due to elimination of a linker with low bond energy (typically ether bond) from the molecule, a coating having improved weatherability and abrasion resistance can be formed.

Specifically, Y is selected from the following: $C_3$-$C_{10}$ alkylene groups such as propylene (trimethylene or methylethylene), butylene (tetramethylene or methylpropylene), and hexamethylene; alkylene groups containing $C_6$-$C_8$ arylene, typically phenylene, such as $C_8$-$C_{16}$ alkylene-arylene groups; a divalent group having alkylene groups bonded via a silalkylene or silarylene structure; and a di-to hexavalent group having alkylene groups bonded to valence bonds of a di- to hexavalent, linear, branched or cyclic organopolysiloxane residue of 2 to 10 silicon atoms, preferably 2 to 5 silicon atoms. Preferably Y is a $C_3$-$C_{10}$ alkylene group, a phenylene-containing alkylene group, a divalent group having alkylene groups bonded via a silalkylene or silarylene structure, or a di- to tetravalent group having alkylene groups bonded to valence bonds of a di- to tetravalent, linear, branched or cyclic organopolysiloxane residue of 2 to 10 silicon atoms, and more preferably $C_3$-$C_6$ alkylene group.

The silalkylene or silarylene structure is exemplified by the following structure.

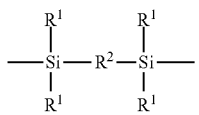

Herein $R^1$ which may be the same or different is a $C_1$-$C_4$ alkyl group such as methyl, ethyl, propyl or butyl, or aryl group such as phenyl. $R^2$ is a $C_1$-$C_4$ alkylene group such as methylene, ethylene, or propylene (trimethylene or methylethylene), or arylene group such as phenylene.

Examples of the linear, branched or cyclic organopolysiloxane residue are shown below.

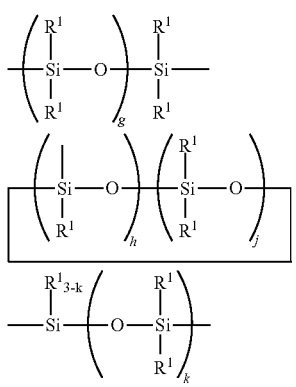

Herein $R^1$ is as defined above, g is an integer of 1 to 9, preferably 1 to 3, h is an integer of 2 to 6, preferably 2 to 4, j is an integer of 0 to 8, preferably 0 or 1, the sum h+j is an integer of 3 to 10, preferably 3 to 5, and k is an integer of 1 to 3, preferably 2 or 3.

Examples of Y are shown below.

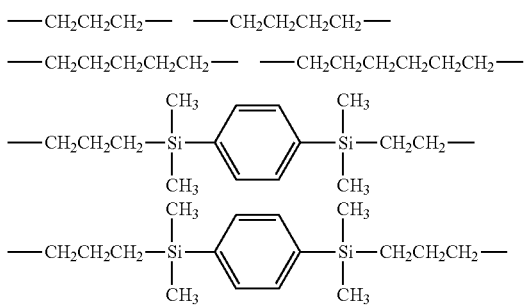

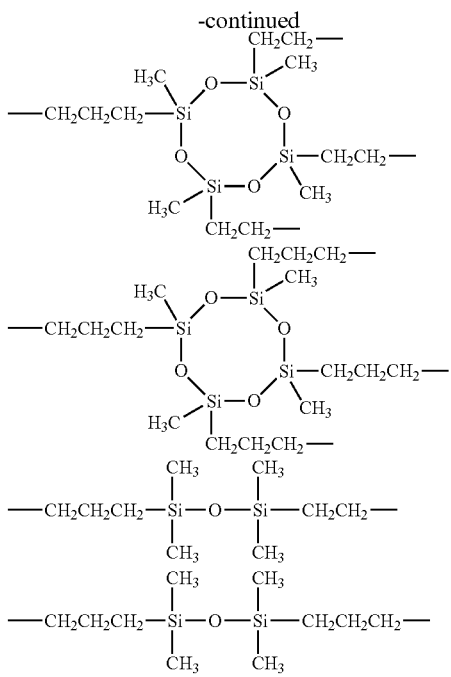

In formula (1), X is each independently a hydrolyzable group. Suitable hydrolyzable groups include $C_1$-$C_{10}$ alkoxy groups such as methoxy, ethoxy, propoxy, isopropoxy, and butoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, halogen groups such as chloro, bromo and iodo. Inter alia, methoxy, ethoxy, isopropenoxy and chloro are preferred.

In formula (1), R is a $C_1$-$C_4$ alkyl group such as methyl, ethyl, propyl or butyl, or a phenyl group, with methyl being preferred. The subscript n is an integer of 1 to 3, preferably 2 or 3. It is most preferred from the standpoints of reactivity and adhesion to substrates that n be 3. The subscript m is an integer of 1 to 5. If m is less than 1, adhesion to substrates is poor. If m is more than 5, an excessively high terminal alkoxy number adversely affects the desired performance. Preferably m is 1, 2 or 3, and most preferably 1.

Examples of the fluoropolyether-containing polymer-modified silane of formula (1) are shown below. In each formula, the repetition number of repeating units in the form of fluorooxyalkyl or fluorooxyalkylene groups, also referred to as degree of polymerization, may be an arbitrary number meeting formula (2) or (3) representative of Rf.

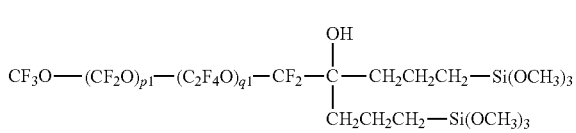

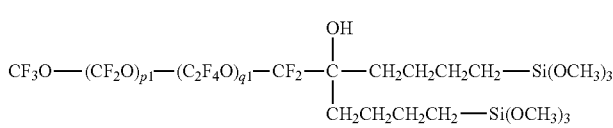

-continued

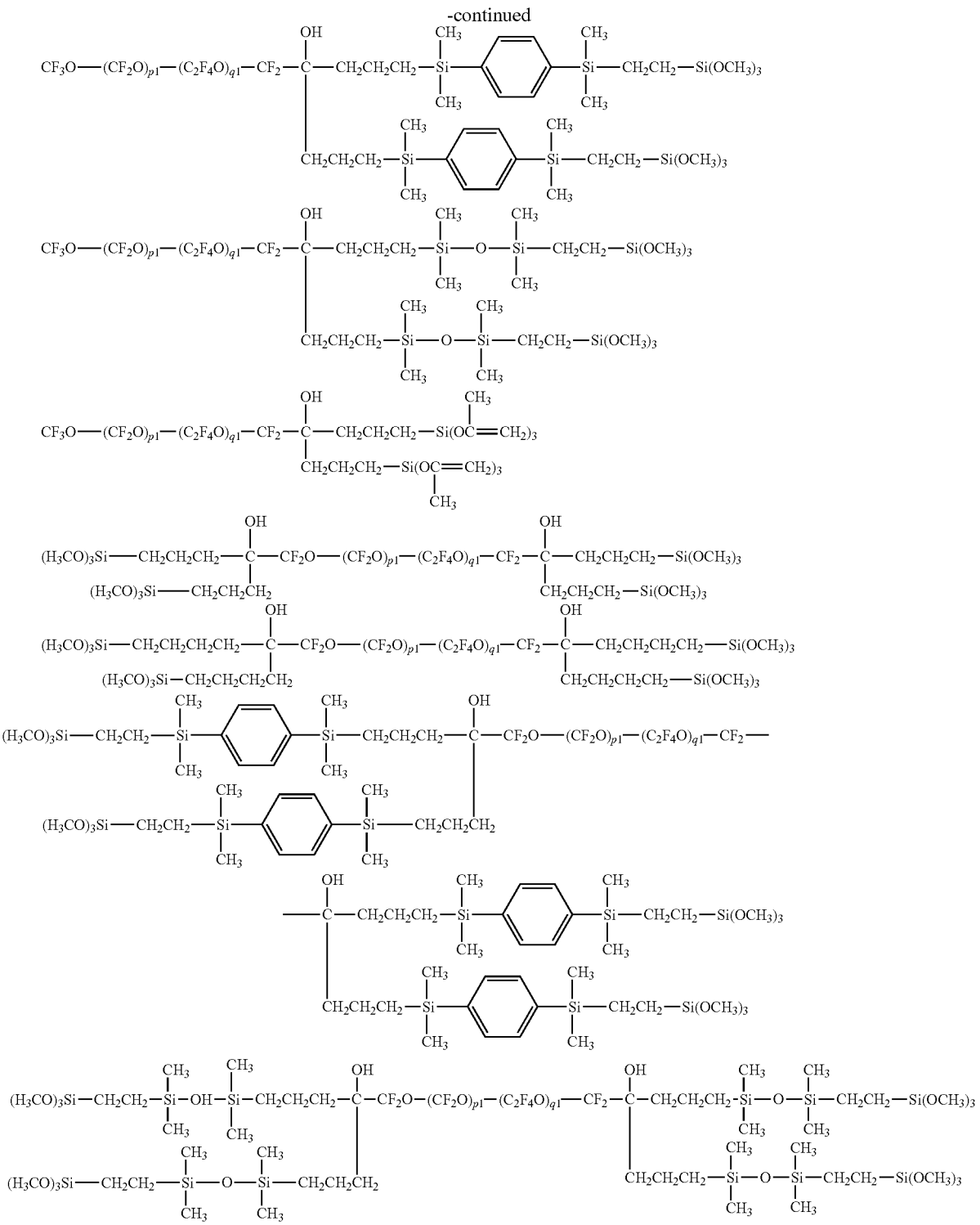

p1 = p-1,
q-1 = q-1
p1:q1 = 47:53,
p1 + q1 ≈ 43

The fluoropolyether-containing polymer-modified silane of formula (1) wherein α=1 may be prepared, for example, by the following methods. In one exemplary method, a fluorooxyalkyl-containing polymer having two olefin sites at one end of the molecular chain is dissolved in a solvent, typically fluorochemical solvent such as 1,3-bis(trifluoromethyl)benzene. To the solution, an organosilicon compound having a SiH group and a hydrolyzable terminal group in the molecule such as trimethoxysilane and a hydrosilylation catalyst such as a toluene solution of chloroplatinic acid/ vinylsiloxane complex are added. The reaction mixture is aged at a temperature of 40 to 120° C., preferably 60 to 100° C., and more preferably about 80° C. for 1 to 72 hours, preferably 36 to 60 hours, and more preferably about 48 hours.

Another method may be employed for preparing the fluoropolyether-containing polymer-modified silane of formula (1) wherein α=1. A fluorooxyalkyl-containing polymer having two olefin sites at one end of the molecular chain is dissolved in a solvent, typically fluorochemical solvent such as 1,3-bistrifluoromethylbenzene. To the solution, an organosilicon compound having a SiH group and a hydrolyzable terminal group in the molecule such as trichlorosilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 36 to 60 hours, and more preferably about 48 hours. Finally, the substituent on the silyl group is converted to a methoxy group, for example.

Instead of the organosilicon compound having a SiH group and a hydrolyzable terminal group in the molecule, an SiH-containing organosilicon compound free of a hydrolyzable terminal group may also be used. In this case, an organosilicon compound having at least two SiH groups is used. Once the organosilicon compound having at least two SiH groups is reacted with a fluorooxyalkyl-containing polymer having two olefin sites at one end of the molecular chain like the above method, a mixture of the polymer having terminal SiH groups and an organosilicon compound having an olefin site and a hydrolyzable terminal group in the molecule such as allyltrimethoxysilane is aged, in the presence of a hydrosilylation catalyst such as a toluene solution of chloroplatinic acid/vinylsiloxane complex, at a temperature of 40 to 120° C., preferably 60 to 100° C., and more preferably about 80° C. for 1 to 72 hours, preferably 36 to 60 hours, and more preferably about 48 hours.

The fluorooxyalkyl-containing polymer having two olefin sites at one end of the molecular chain is typically a fluorooxyalkyl-containing polymer of the general formula (5):

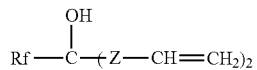

(5)

wherein Rf is as defined above, and Z is a divalent hydrocarbon group.

In formula (5), Z is a divalent hydrocarbon group, examples of which include $C_1$-$C_8$, preferably $C_1$-$C_4$ alkylene groups such as methylene, ethylene, propylene (trimethylene or methylethylene), butylene (tetramethylene or methylpropylene), hexamethylene, and octamethylene, arylene groups such as phenylene, and combinations of two or more of the foregoing such as alkylene-arylene groups. Preferably Z is a $C_1$-$C_4$ linear alkylene group or phenylene.

Preferred examples of the fluorooxyalkyl-containing polymer of formula (5) are shown below. In each formula, the repetition number of repeating units in the form of fluorooxyalkyl groups, also referred to as degree of polymerization, may be an arbitrary number meeting formula (2) representative of Rf.

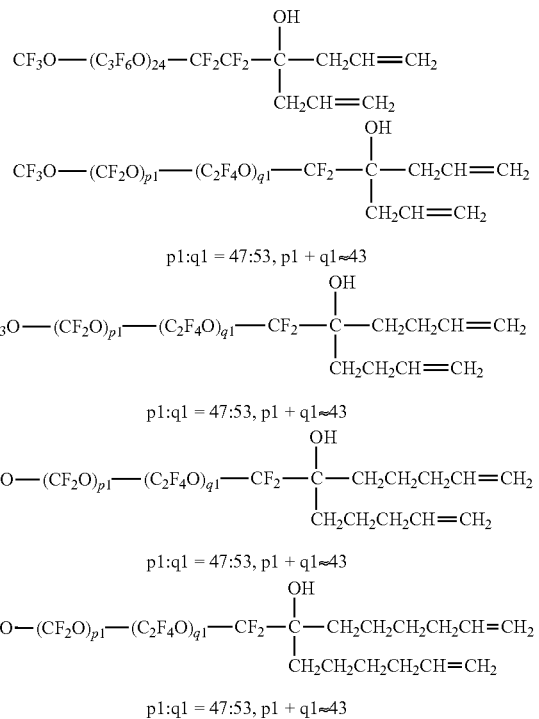

The fluorooxyalkyl-containing polymer of formula (5) may be prepared, for example, by the following method. A perfluorooxyalkyl-containing polymer having an acid fluoride group (—C(=O)—F) at one end of the molecular chain is mixed with a Grignard reagent as a nucleophilic reagent and a solvent such as 1,3-bistrifluoromethylbenzene and tetrahydrofuran, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkyl-containing polymer may have another group at one end of the molecular chain, such as acid halide, acid anhydride, ester, carboxylic acid or amide. Examples of the perfluorooxyalkyl-containing polymer having such a group at one end of the molecular chain are shown below.

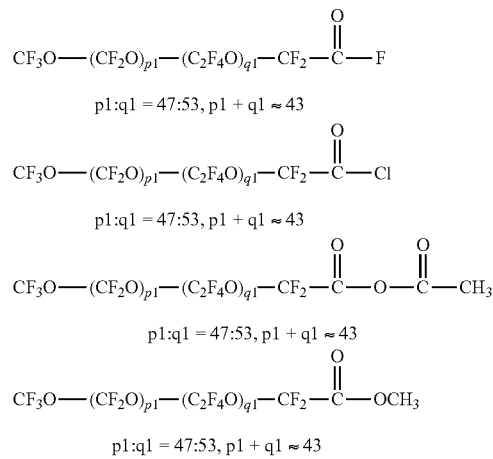

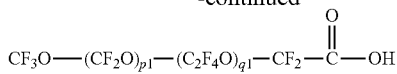

p1:q1 = 47:53, p1 + q1 ≈ 43

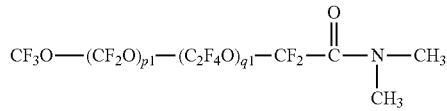

p1:q1 = 47:53, p1 + q1 ≈ 43

The nucleophilic reagent used in the preparation of a fluorooxyalkyl-containing polymer having formula (5) may be selected from allylmagnesium halides, 3-butenylmagnesium halides, 4-pentenylmagnesium halides, and 5-hexenylmagnesium halides, for example. Corresponding lithium reagents may also be used. Relative to the perfluorooxyalkyl-containing polymer, the nucleophilic reagent may be used in an amount of 2 to 5 equivalents, preferably 2.5 to 3.5 equivalents, and more preferably about 3 equivalents per equivalent of reactive terminal group (concentration) of the polymer.

As the solvent used in the preparation of a fluorooxyalkyl-containing polymer having formula (5), suitable fluorochemical solvents include hydrofluoroether (HFE) solvents (commercially available as Novec® products from 3M), such as 1,3-bistrifluoromethylbenzene, trifluoromethylbenzene, methyl nonafluorobutyl ether, methyl nonafluoroisobutyl ether, ethyl nonafluorobutyl ether, ethyl nonafluoroisobutyl ether, 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 100 to 200 parts, and more preferably about 150 parts by weight per 100 parts by weight of the perfluorooxyalkyl-containing polymer.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkyl-containing polymer having two olefin sites at one end of the molecular chain.

As mentioned previously, the method for the preparation of a fluoropolyether-containing polymer-modified silane having formula (1) wherein α=1 uses a solvent. As the solvent, fluorochemical solvents are preferred and include hydrofluoroether (HFE) solvents (commercially available as Novec® products from 3M), such as 1,3-bistrifluoromethylbenzene, trifluoromethylbenzene, methyl nonafluorobutyl ether, methyl nonafluoroisobutyl ether, ethyl nonafluorobutyl ether, ethyl nonafluoroisobutyl ether, 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). The solvent may be used in an amount of 10 to 300 parts, preferably 50 to 150 parts, and more preferably about 100 parts by weight per 100 parts by weight of the fluorooxyalkyl-containing polymer having two olefin sites at one end of the molecular chain.

The organosilicon compound having a SiH group and a hydrolyzable terminal group in the molecule is preferably selected from compounds having the general formulae (6) to (9).

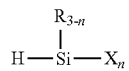

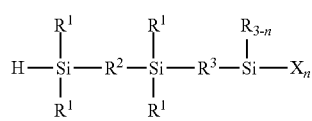

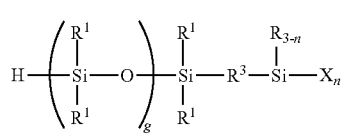

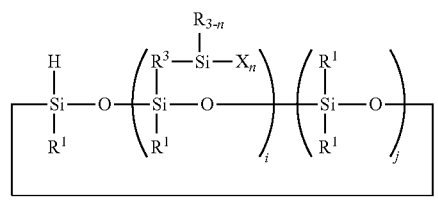

Herein R, X, n, $R^1$, $R^2$, g and j are as defined above, $R^3$ is a $C_2$-$C_8$ divalent hydrocarbon group, i is an integer of 2 to 9, preferably 2 to 4, and the sum i+j is an integer of 2 to 9.

$R^3$ is a $C_2$-$C_8$, preferably $C_2$-$C_3$ divalent hydrocarbon group, examples of which include alkylene groups such as methylene, ethylene, propylene (trimethylene or methylethylene), butylene (tetramethylene or methylpropylene), hexamethylene, and octamethylene, arylene groups such as phenylene, and combinations of two or more of the foregoing such as alkylene-arylene groups. Inter alia, ethylene and trimethylene are preferred.

Examples of the organosilicon compound include trimethoxysilane, triethoxysilane, tripropoxysilane, triisopropoxysilane, tributoxysilane, triisopropenoxysilane, triacetoxysilane, trichlorosilane, tribromosilane, and triiodosilane as well as silanes of the following formulae.

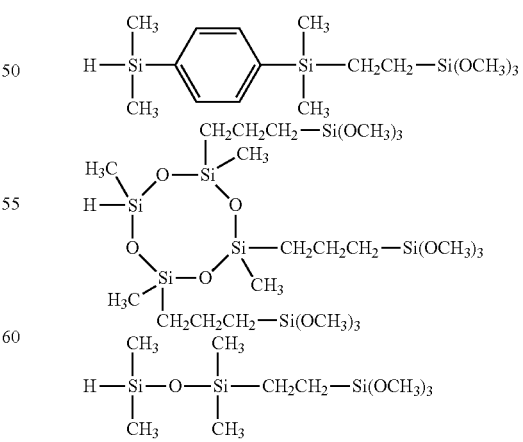

For the reaction of the fluorooxyalkyl-containing polymer having two olefin sites at one end of the molecular chain with the organosilicon compound having a SiH group and hydrolyzable terminal group, the organosilicon compound may be used in an amount of 2 to 6 equivalents, preferably 2.2 to 3.5 equivalents, and more preferably about 3 equivalents per equivalent of reactive terminal group (concentration) of the polymer.

The organosilicon compound having at least two SiH groups, but not hydrolyzable terminal groups in the molecule is preferably selected from compounds having the general formulae (10) to (12).

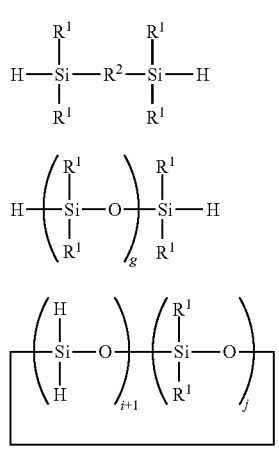

Herein $R^1$, $R^2$, g, j and i are as defined above.

Examples of the organosilicon compound having at least two SiH groups, but not hydrolyzable terminal groups in the molecule are shown below.

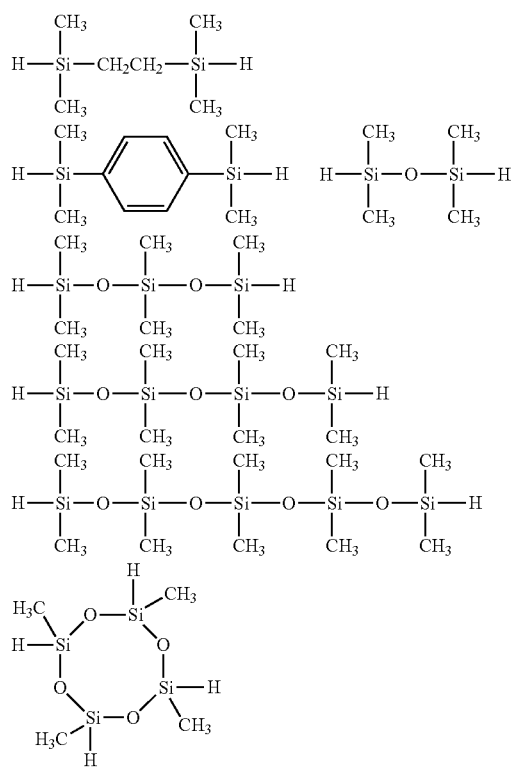

For the reaction of the fluorooxyalkyl-containing polymer having two olefin sites at one end of the molecular chain with the organosilicon compound having at least two SiH groups, but not hydrolyzable terminal groups, the organosilicon compound may be used in an amount of 5 to 20 equivalents, preferably 7.5 to 12.5 equivalents, and more preferably about 10 equivalents per equivalent of reactive terminal group (concentration) of the polymer.

The organosilicon compound having an olefin site and a hydrolyzable terminal group in the molecule is preferably selected from compounds having the general formula (13).

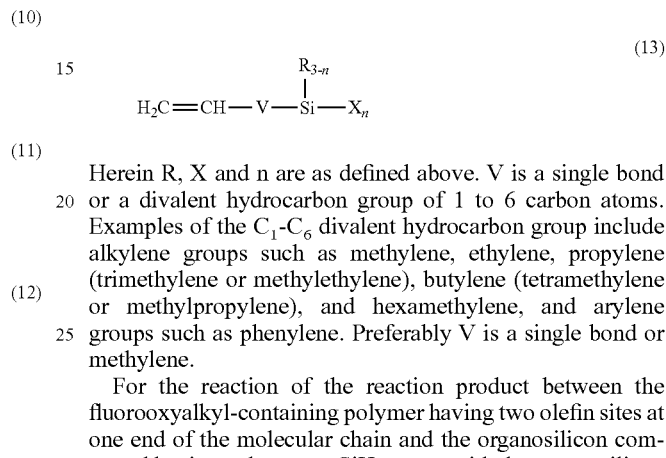

Herein R, X and n are as defined above. V is a single bond or a divalent hydrocarbon group of 1 to 6 carbon atoms. Examples of the $C_1$-$C_6$ divalent hydrocarbon group include alkylene groups such as methylene, ethylene, propylene (trimethylene or methylethylene), butylene (tetramethylene or methylpropylene), and hexamethylene, and arylene groups such as phenylene. Preferably V is a single bond or methylene.

For the reaction of the reaction product between the fluorooxyalkyl-containing polymer having two olefin sites at one end of the molecular chain and the organosilicon compound having at least two SiH groups with the organosilicon compound having an olefin site and a hydrolyzable terminal group in the molecule, typically allyltrimethoxysilane, the latter organosilicon compound may be used in an amount of 2 to 6 equivalents, preferably 2.2 to 3.5 equivalents, and more preferably about 3 equivalents per equivalent of reactive terminal group (concentration) of the polymer.

Typical of the hydrosilylation catalyst are platinum group metal based catalysts including platinum black, chloroplatinic acid, alcohol-modified chloroplatinic acid, complexes of chloroplatinic acid with olefin, aldehyde, vinylsiloxane, and acetylene alcohol, tetrakis(triphenylphosphine)palladium, and chlorotris(triphenylphosphine)rhodium. Inter alia, platinum compounds such as vinylsiloxane coordination compounds are preferred. The hydrosilylation catalyst is preferably used in an amount to provide 0.1 to 100 ppm, more preferably 1 to 50 ppm of transition metal based on the weight of the fluorooxyalkyl-containing polymer having two olefin sites at one end of the molecular chain or the reaction product between the fluorooxyalkyl-containing polymer having two olefin sites at one end of the molecular chain and the organosilicon compound having at least two SiH groups.

In the other method involving the steps of hydrosilylation reaction of a fluorooxyalkyl-containing polymer having two olefin sites at one end of the molecular chain with an organosilicon compound having a SiH group and a hydrolyzable terminal group in the molecule such as trichlorosilane, and converting the substituent on the silyl group to a methoxy group, for example, the conversion step may be similar to the well-known reaction procedure for the alkoxysilylation of hydrolyzable silyl groups. For example, a fluorooxyalkyl-containing polymer terminated with a trichlorosilyl group may be reacted with a lower alcohol (e.g., methanol) in the presence of an amine (e.g., triethylamine, pyridine or urea) as acid acceptor, for effecting methoxysilylation.

Thereafter, the solvent and unreacted reactants are distilled off in vacuum, yielding the target compound. For example, when the fluorooxyalkyl-containing polymer having two olefin sites at one end of the molecular chain is of the formula:

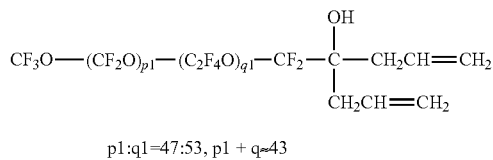

p1:q1=47:53, p1 + q≈43 and the organosilicon compound having a SiH group and a hydrolyzable terminal group is trimethoxysilane, there is obtained a compound of the following formula.

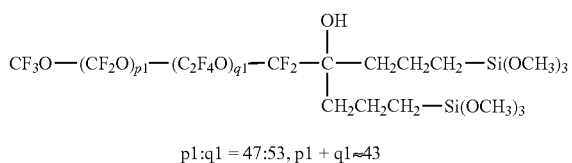

p1:q1 = 47:53, p1 + q1≈43

Next, the fluoropolyether-containing polymer-modified silane of formula (1) wherein α=2 may be prepared, for example, by the following methods. In one exemplary method, a fluorooxyalkylene-containing polymer having two olefin sites at each of both ends of the molecular chain is dissolved in a solvent, typically fluorochemical solvent such as 1,3-bistrifluoromethylbenzene. To the solution, an organosilicon compound having a SiH group and a hydrolyzable terminal group in the molecule such as trimethoxysilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 36 to 60 hours, and more preferably about 48 hours.

Another method may be employed for preparing the fluoropolyether-containing polymer-modified silane of formula (1) wherein α=2. A fluorooxyalkylene-containing polymer having two olefin sites at each end of the molecular chain is dissolved in a solvent, typically fluorochemical solvent such as 1,3-bistrifluoromethylbenzene. To the solution, an organosilicon compound having a SiH group and a hydrolyzable terminal group in the molecule such as trichlorosilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 36 to 60 hours, and more preferably about 48 hours. Finally, the substituent on the silyl group is converted to a methoxy group, for example.

Instead of the organosilicon compound having a SiH group and a hydrolyzable terminal group in the molecule, an SiH-containing organosilicon compound free of a hydrolyzable terminal group may also be used. In this case, an organosilicon compound having at least two SiH groups is used. Once the organosilicon compound having at least two SiH groups is reacted with a fluorooxyalkylene-containing polymer having two olefin sites at each end of the molecular chain like the above method, a mixture of the polymer having terminal SiH groups and an organosilicon compound having an olefin site and a hydrolyzable terminal group in the molecule such as allyltrimethoxysilane is aged, in the presence of a hydrosilylation catalyst such as a toluene solution of chloroplatinic acid/vinylsiloxane complex, at a temperature of 40 to 120° C., preferably 60 to 100° C., and more preferably about 80° C. for 1 to 72 hours, preferably 36 to 60 hours, and more preferably about 48 hours.

The fluorooxyalkylene-containing polymer having two olefin sites at each end of the molecular chain is typically a fluorooxyalkylene-containing polymer of the general formula (14):

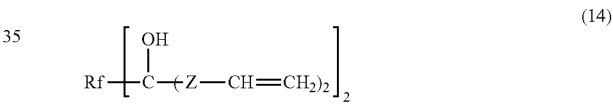

wherein Rf and Z are as defined above.

Preferred examples of the fluorooxyalkylene-containing polymer of formula (14) are shown below. In each formula, the repetition number of repeating units in the form of fluorooxyalkylene groups, also referred to as degree of polymerization, may be an arbitrary number meeting formula (3) representative of Rf.

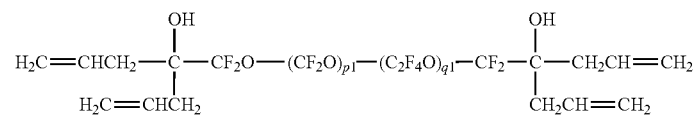

p1:q1 = 47:53, p1 + q1≈43

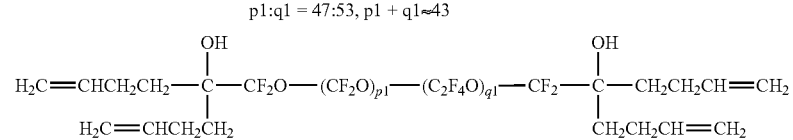

p1:q1 = 47:53, p1 + q1≈43

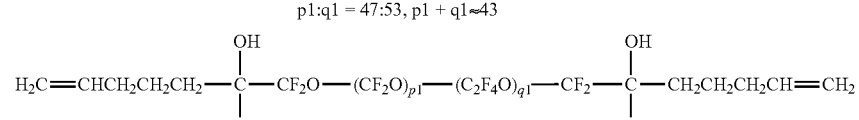

p1:q1 = 47:53, p1 + q1≈43

-continued

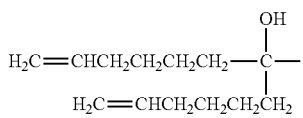 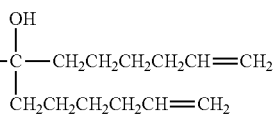

p1:q1 = 47:53, p1 + q1≈43

The fluorooxyalkylene-containing polymer of formula (14) may be prepared, for example, by the following method. A perfluorooxyalkylene-containing polymer having an acid fluoride group (—C(=O)—F) at each end of the molecular chain is mixed with a Grignard reagent as a nucleophilic reagent and a solvent such as 1,3-bistrifluoromethylbenzene and tetrahydrofuran, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkylene-containing polymer may have another group at each end of the molecular chain, such as acid halide, acid anhydride, ester, carboxylic acid or amide. Examples of the perfluorooxyalkylene-containing polymer having such groups at both ends of the molecular chain are shown below.

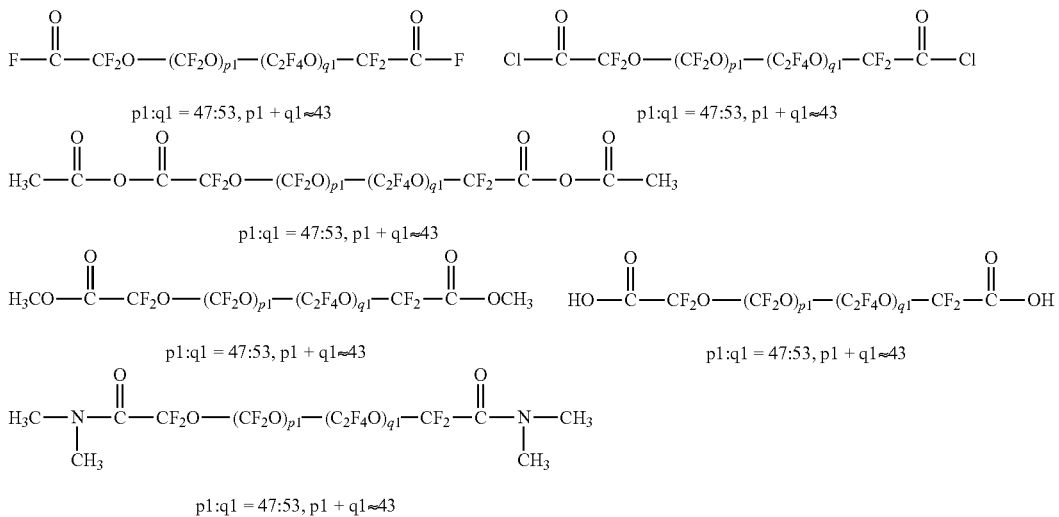

The nucleophilic reagent used in the preparation of the fluorooxyalkylene-containing polymer having formula (14) may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 4 to 10 equivalents, preferably 5 to 7 equivalents, and more preferably about 6 equivalents per equivalent of reactive terminal group (concentration) of the perfluorooxyalkylene-containing polymer.

As the solvent used in the preparation of the fluorooxyalkylene-containing polymer having formula (14), suitable fluorochemical solvents include hydrofluoroether (HFE) solvents (commercially available as Novec® products from 3M), such as 1,3-bistrifluoromethylbenzene, trifluoromethylbenzene, methyl nonafluorobutyl ether, methyl nonafluoroisobutyl ether, ethyl nonafluorobutyl ether, ethyl nonafluoroisobutyl ether, 1,1,1,2,3,4,4,5,5,5-decafluoro-3-methoxy-2-(trifluoromethyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 100 to 200 parts, and more preferably about 150 parts by weight per 100 parts by weight of the perfluorooxyalkylene-containing polymer.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkylene-containing polymer having two olefin sites at each end of the molecular chain.

As mentioned previously, the method for the preparation of a fluoropolyether-containing polymer-modified silane having formula (1) wherein α=2 uses a solvent. As the solvent, fluorochemical solvents are preferred and include hydrofluoroether (HFE) solvents (commercially available as Novec® products from 3M), such as 1,3-bistrifluoromethylbenzene, trifluoromethylbenzene, methyl nonafluorobutyl ether, methyl nonafluoroisobutyl ether, ethyl nonafluorobutyl ether, ethyl nonafluoroisobutyl ether, 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). The solvent may be used in an amount of 10 to 300 parts, preferably 50 to 150 parts, and more preferably about 100 parts by weight per 100 parts by weight of the fluorooxy-alkylene-containing polymer having two olefin sites at each end of the molecular chain.

The organosilicon compound having a SiH group and a hydrolyzable terminal group in the molecule is preferably selected from compounds having the general formulae (6) to (9).

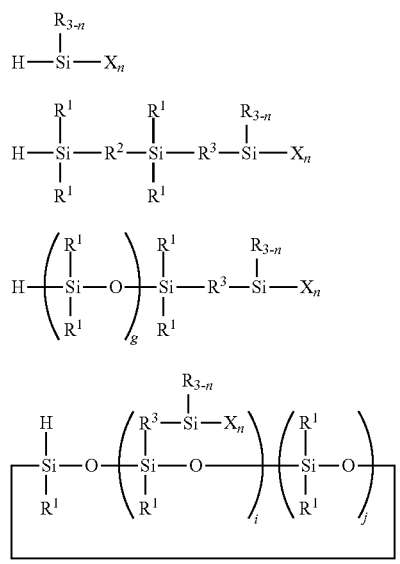

Herein R, X, n, R$^1$, R$^2$, R$^3$, g, j, and i are as defined above.

Examples of the organosilicon compound include trimethoxysilane, triethoxysilane, tripropoxysilane, triisopropoxysilane, tributoxysilane, triisopropenoxysilane, triacetoxysilane, trichlorosilane, tribromosilane, and triiodosilane as well as silanes of the following formulae.

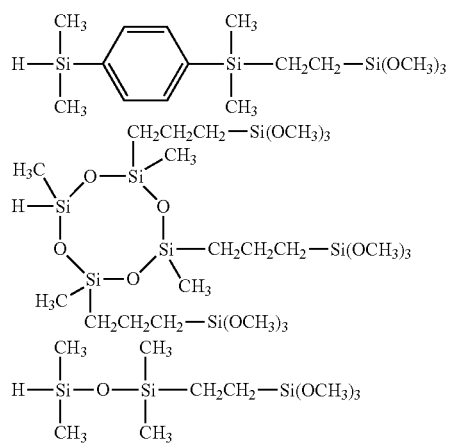

For the reaction of the fluorooxyalkylene-containing polymer having two olefin sites at each end of the molecular chain with the organosilicon compound having a SiH group and a hydrolyzable terminal group, the organosilicon compound may be used in an amount of 4 to 12 equivalents, preferably 4.4 to 7 equivalents, and more preferably about 6 equivalents per equivalent of reactive terminal group (concentration) of the polymer.

The organosilicon compound having at least two SiH groups, but not hydrolyzable terminal groups in the molecule is preferably selected from compounds having the general formulae (10) to (12).

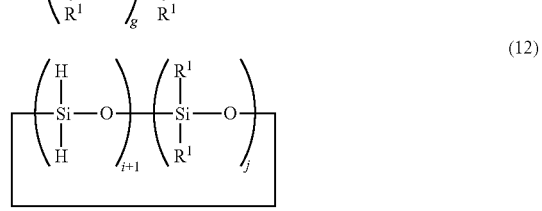

Herein R$^1$, R$^2$, g, j and i are as defined above.

Examples of the organosilicon compound having at least two SiH groups, but not hydrolyzable terminal groups in the molecule are shown below.

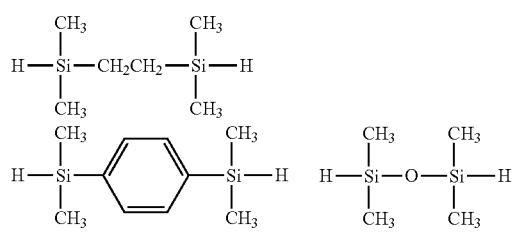

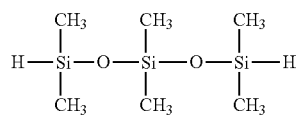

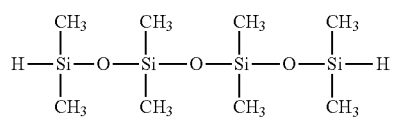

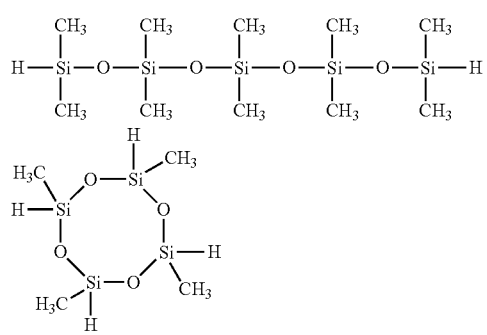

For the reaction of the fluorooxyalkylene-containing polymer having two olefin sites at each end of the molecular chain with the organosilicon compound having at least two SiH groups, but not hydrolyzable terminal groups, the organosilicon compound may be used in an amount of 10 to 40 equivalents, preferably 15 to 25 equivalents, and more preferably about 20 equivalents per equivalent of reactive terminal group (concentration) of the polymer.

The organosilicon compound having an olefin site and a hydrolyzable terminal group in the molecule is preferably selected from compounds having the general formula (13).

Herein V, R, X and n are as defined above.

For the reaction of the reaction product between the fluorooxyalkylene-containing polymer having two olefin sites at each end of the molecular chain and the organosilicon compound having at least two SiH groups with the organosilicon compound having an olefin site and a hydrolyzable terminal group in the molecule, typically allyltrimethoxysilane, the latter organosilicon compound may be used in an amount of 4 to 12 equivalents, preferably 4.4 to 7 equivalents, and more preferably about 6 equivalents per equivalent of reactive terminal group (concentration) of the polymer.

Typical of the hydrosilylation reaction catalyst are platinum group metal based catalysts including platinum black, chloroplatinic acid, alcohol-modified chloroplatinic acid, complexes of chloroplatinic acid with olefin, aldehyde, vinylsiloxane, and acetylene alcohol, tetrakis(triphenylphosphine)palladium, and chlorotris(triphenylphosphine)rhodium. Inter alia, platinum compounds such as vinylsiloxane coordination compounds are preferred. The hydrosilylation catalyst is preferably used in an amount to provide 0.1 to 100 ppm, more preferably 1 to 50 ppm of transition metal based on the weight of the fluorooxyalkylene-containing polymer having two olefin sites at each end of the molecular chain or the reaction product between the fluorooxyalkylene-containing polymer having two olefin sites at each end of the molecular chain and the organosilicon compound having at least two SiH groups.

In the other method involving the steps of hydrosilylation reaction of a fluorooxyalkylene-containing polymer having two olefin sites at each end of the molecular chain with an organosilicon compound having a SiH group and a hydrolyzable terminal group in the molecule such as trichlorosilane, and converting the substituent on the silyl group to a methoxy group, for example, the conversion step may be similar to the well-known reaction procedure for the alkoxysilylation of hydrolyzable silyl groups. For example, a fluorooxyalkyl-containing polymer terminated with a trichlorosilyl group may be reacted with a lower alcohol (e.g., methanol) in the presence of an amine (e.g., triethylamine, pyridine or urea) as acid acceptor, for effecting methoxysilylation.

Thereafter, the solvent and unreacted reactants are distilled off in vacuum, yielding the target compound. For example, when the fluorooxyalkylene-containing polymer having two olefin sites at each end of the molecular chain is of the formula:

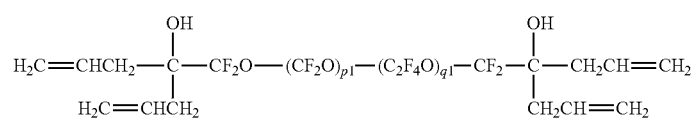

p1:q1 = 48:52, p1 + q1≈43 and the organosilicon compound having a SiH group and a hydrolyzable terminal group is trimethoxysilane, there is obtained a compound of the following formula.

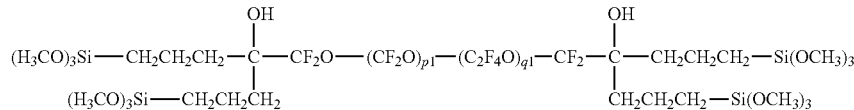

p1:q1 = 47:53, p1 + q1≈43

Another embodiment of the invention is a surface treating agent comprising a fluoropolyether-containing polymer having both an active hydrogen-containing functional group and a hydrolyzable group and/or a partial hydrolytic condensate thereof.

The presence of active hydrogen within the polymer ensures that hydrolytic reaction of hydrolyzable groups (e.g., alkoxysilyl) is accelerated without a need for curing catalysts. Suitable active hydrogen-containing groups include hydroxyl, carboxyl, amino, imino, N-hydroxyl, thiol, sulfo and phosphoric acid groups, with hydroxyl and carboxyl being preferred. Suitable hydrolyzable groups include $C_1$-$C_{10}$ alkoxy groups such as methoxy, ethoxy, propoxy, isopropoxy, and butoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen groups such as chloro, bromo and iodo.

The fluoropolyether-containing polymer having both an active hydrogen-containing functional group and a hydrolyzable group is preferably the fluoropolyether-containing polymer-modified silane of formula (1) defined above. The surface treating agent may comprise a partial hydrolytic condensate obtained by previously subjecting the fluoropolyether-containing polymer-modified silane (specifically its terminal hydrolyzable group) to partial hydrolysis and condensation in a well-known manner.

In a preferred embodiment, the surface treating agent may further comprise a fluoropolyether-containing polymer having the general formula (4):

A-Rf'-A  (4)

wherein A is a monovalent fluorinated group terminated with —$CF_3$ radical, and Rf' is a divalent fluorooxyalkylene-containing polymer residue. This polymer is also referred to as "nonfunctional polymer."

In formula (4), A is a monovalent fluorinated group terminated with —$CF_3$ radical, preferably a linear perfluoroalkyl group of 1 to 6 carbon atoms, and most preferably $CF_3$. Rf' may be identical with or different from the divalent fluorooxyalkylene-containing polymer residue represented by Rf in formula (1). Preferred examples of Rf' are given below.

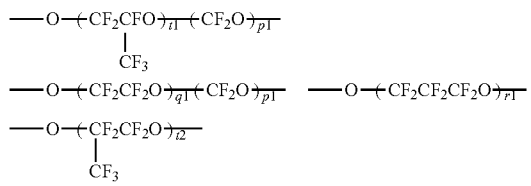

Herein p1 is an integer of 5 to 200, preferably 10 to 100; q1 is an integer of 5 to 200, preferably 10 to 100; r1 is an integer of 10 to 200, preferably 20 to 100; t1 is an integer of 5 to 200, preferably 10 to 100; t2 is an integer of 10 to 200, preferably 20 to 100; t1+p1 is an integer of 10 to 200, preferably 20 to 100; q1+p1 is an integer of 10 to 200, preferably 20 to 100.

Examples of the nonfunctional polymer having formula (4) are shown below.

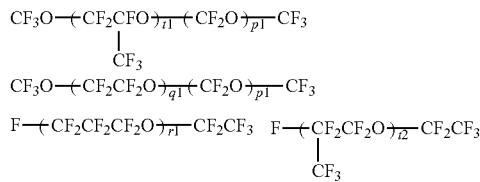

Herein p1, q1, r1, t1, and t2 are as defined above.

When used, the nonfunctional polymer having formula (4) may be blended in any desired amount, preferably in an amount of 0.1 to 60%, more preferably 10 to 40% by weight based on the weight of the fluoropolyether-containing polymer-modified silane having formula (1). Too much amounts may be detrimental to adhesion.

To the surface treating agent, a hydrolytic condensation catalyst may be added if desired. Suitable hydrolytic condensation catalysts include organotin compounds such as dibutyltin dimethoxide and dibutyltin dilaurate, organotitanium compounds such as tetra-n-butyl titanate, organic acids such as acetic acid, methanesulfonic acid, and fluorine-modified carboxylic acids, and inorganic acids such as hydrochloric acid and sulfuric acid. Of these, acetic acid, tetra-n-butyl titanate, dibutyltin dilaurate, and fluorine-modified carboxylic acids are preferred. The catalyst may be added in a catalytic amount, typically 0.01 to 5 parts, more preferably 0.1 to 1 part by weight per 100 parts by weight of the fluorooxyalkylene-containing polymer and/or partial hydrolytic condensate thereof.

The surface treating agent may further comprise a solvent. Suitable solvents include fluorine-modified aliphatic hydrocarbon solvents such as perfluoroheptane and perfluorooctane; fluorine-modified aromatic hydrocarbon solvents such as m-xylene hexafluoride, benzotrifluoride, and 1,3-trifluoromethylbenzene; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine and perfluorotripentylamine; hydrocarbon solvents such as petroleum benzine, mineral spirits, toluene, and xylene; ketone solvents such as acetone, methyl ethyl ketone, and methyl isobutyl ketone. Of these, fluorine-modified solvents are desirable for solubility and wettability, with m-xylene hexafluoride, perfluoro(2-butyltetrahydrofuran), perfluorotributylamine, and ethyl perfluorobutyl ether being more desirable.

The solvents may be used alone or in admixture of two or more while it is preferred that the fluoropolyether-containing polymer-modified silane and/or partial hydrolytic condensate thereof be uniformly dissolved in the solvent. An optimum concentration of the fluoropolyether-containing polymer-modified silane and/or partial hydrolytic condensate thereof in the solvent is 0.01 to 40% by weight, especially 0.05 to 25% by weight of the surface treating agent, though it varies with a particular treating mode.

The surface treating agent may be applied to a substrate by any well-known techniques such as brush coating, dipping, spraying and evaporation. In the case of evaporation, the heating mode may be either resistance heating or EB heating. A coating of the surface treating agent is cured to the substrate. The curing conditions vary with a particular coating or curing technique. When the coating technique is evaporation or spray coating and the substrate is $SiO_2$-deposited glass, for example, suitable curing conditions include a temperature from room temperature (25° C.) to 200° C. and a time of 5 minutes to 24 hours, especially 10 minutes to 12 hours. Humid curing conditions are also useful. A coating of the surface treating agent may cure at room temperature in a time of 10 minutes to 24 hours, typically 30 minutes to 12 hours, and even in a short time of 30 minutes to 1 hour. The cured coating typically has a thickness of 0.1 to 100 nm, desirably 1 to 20 nm although the thickness depends on the type of substrate.

Before the surface treating agent comprising the fluoropolyether-containing polymer having an active hydrogen-containing functional group and a hydrolyzable group and/or partial hydrolytic condensate thereof is applied to a substrate, the hydrolyzable groups may be previously hydrolyzed. In the case of spray coating, for example, the surface treating agent is diluted with a fluorochemical solvent having some water added thereto, whereby the hydrolyzable groups in the agent are hydrolyzed to form Si—OH groups in the solution. The resulting solution is spray coated, with the advantage of fast cure after coating.

The substrate to be treated with the surface treating agent is not particularly limited, and may be made of any desired materials including paper, fabric, metals, metal oxides, glass, plastics, ceramics, and quartz. The surface treating agent is effective for endowing the substrate with excellent water/oil repellency, and its coating has high UV resistance and long-lasting antifouling performance.

Various articles may be treated with the surface treating agent. Preferred articles include optical articles, touch panels, antireflective film, $SiO_2$-deposited glass, strengthened glass, sapphire glass, and quartz substrates which are used as parts in car navigation systems, mobile phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, and antireflective film.

Since a coating having excellent water/oil repellency, UV resistance and long-lasting antifouling performance is formed by coating the substrate with the surface treating agent and curing under mild conditions, typically at room temperature in a short time, the agent is particularly useful as a water/oil repellent layer on touch panel displays and antireflective film.

EXAMPLE

Examples of the invention are given below by way of illustration and not by way of limitation.

Synthesis Example 1

A reactor was charged with 150 g of tetrahydrofuran and 300 g of 1,3-bistrifluoromethylbenzene, to which 160 ml of 0.7M allylmagnesium bromide was added dropwise. Subsequently, 300 g ($4.8 \times 10^{-2}$ mol) of a compound of the following formula (I) was slowly added dropwise.

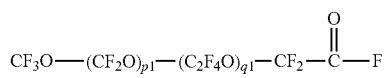
(I)

$p1:q1 = 47:53, p1 + q1 \approx 43$

The resulting solution was heated at 60° C. for 4 hours. Thereafter, it was cooled to room temperature and added dropwise to 300 g of 1.2M hydrochloric acid aqueous solution to quench the reaction. The lower layer or fluoro compound layer was recovered by separatory operation and washed with acetone. The lower layer or fluoro compound layer after washing was recovered again. The residual solvent was distilled off in vacuum, yielding 292 g of a fluoropolyether-containing polymer of the following formula (II).

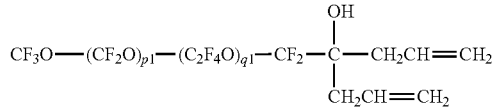
(II)

$p1:q1 = 47:53, p1 + q1 \approx 43$

Example 1

A reactor was charged with 200 g ($2.6 \times 10^{-2}$ mol) of the compound having the formula (II) shown below, 200 g of 1,3-bistrifluoromethylbenzene, 12.7 g ($1.1 \times 10^{-1}$ mol) of trimethoxysilane, and $6.0 \times 10^{-1}$ g of a toluene solution of chloroplatinic acid/vinylsiloxane complex (containing $1.6 \times 10^{-5}$ mol of Pt), which were mixed.

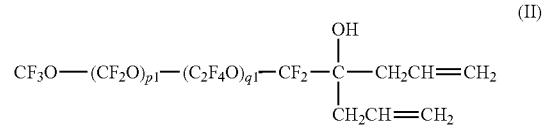
(II)

$p1:q1 = 47:53, p1 + q1 \approx 43$

The solution was aged at 80° C. for 40 hours. Thereafter, the solvent and unreacted reactants were distilled off in vacuum. Subsequently, the residual low- and high-boiling fractions were removed by means of a molecular distillation still, obtaining 100 g of a liquid product.

On NMR analysis, the product was identified to have a structure of the following formula (III).

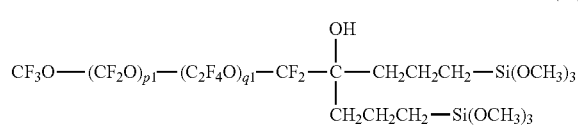
(III)

$p1:q1 = 47:53, p1 + q1 \approx 43$ $^1$H—NMR $\delta 0.2 - 2.2$ (—C$\underline{H}_2$C$\underline{H}_2$C$\underline{H}_2$—) 12H $\delta 3.0 - 3.5$ (—Si(OC$\underline{H}_3$)$_3$) 18H Example 2

In a reactor, 200 g ($2.6 \times 10^{-2}$ mol) of the compound having the formula (II) shown below was dissolved in 200 g of 1,3-bistrifluoromethylbenzene.

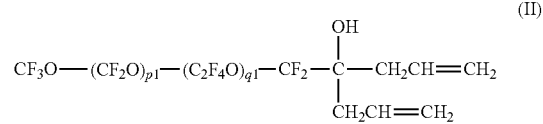
(II)

$p1:q1 = 47:53, p1 + q1 \approx 43$

To the solution, 22.0 g ($1.1 \times 10^{-2}$ mol) of triisopropenoxysilane and $6.0 \times 10^{-1}$ g of a toluene solution of chloroplatinic acid/vinylsiloxane complex (containing $1.6 \times 10^{-5}$ mol of Pt) were added dropwise. The solution was aged at 80° C. for 39 hours. Thereafter, the solvent and unreacted reactants were distilled off in vacuum. Subsequently, the residual low- and high-boiling fractions were removed by means of a molecular distillation still, obtaining 97 g of a liquid product.

On NMR analysis, the product was identified to have a structure of the following formula (IV).

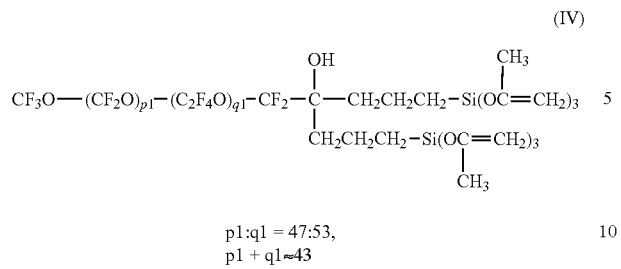

(IV)

p1:q1 = 47:53,
p1 + q1 ≈ 43

$^1$H-NMR

δ0.2-2.2(—C$\underline{H_2}$C$\underline{H_2}$C$\underline{H_2}$—)12H
δ1.6-1.8(—Si(OC(C$\underline{H_3}$)=CH$_2$)$_3$)6H
δ3.8-4.2(—Si(OC(CH$_3$)=C$\underline{H_2}$)$_3$)4H

Example 3

In a reactor, 200 g (1.3×10$^{-2}$ mol) of the compound having the formula (II) shown below was dissolved in 200 g of 1,3-bistrifluoromethylbenzene.

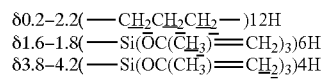

(II)

p1:q1 = 47:53, p1 + q1 ≈ 43

To the solution, 31.1 g (1.1×10$^{-1}$ mol) of 1-[1 or 2-(trimethoxysilyl)ethyl]-1,1,3,3-tetramethyldisiloxane and 6.0×10$^{-1}$ g of a toluene solution of chloroplatinic acid/vinylsiloxane complex (containing 1.6×10$^{-5}$ mol of Pt) were added dropwise. The solution was aged at 80° C. for 40 hours. Thereafter, the solvent and unreacted reactants were distilled off in vacuum. Subsequently, the residual low- and high-boiling fractions were removed by means of a molecular distillation still, obtaining 93 g of a liquid product.

On NMR analysis, the product was identified to have a structure of the following formula (V).

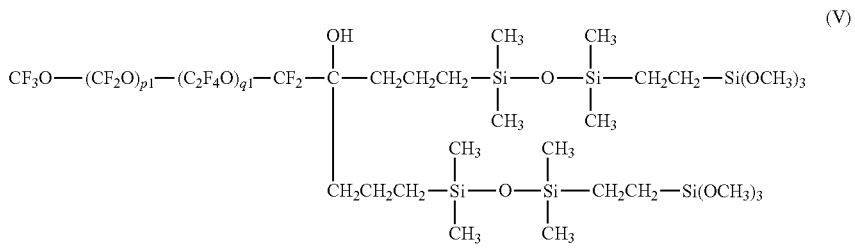

(V)

p1 = p-1,
q-1 = q-1
p1:q1 = 47:53,
p1 + q1 ≈ 43

$^1$H-NMR

δ0.2-2.2(C—C$\underline{H_2}$C$\underline{H_2}$C$\underline{H_2}$—Si)12H
δ0.1-0.0(—Si(C$\underline{H_3}$)$_2$—)24H
δ0.2-1.0(Si—C$\underline{H_2}$C$\underline{H_2}$—Si)8H
δ3.0-3.5(—Si(OC$\underline{H_3}$)$_3$)18H

Synthesis Example 2

A reactor was charged with 150 g of tetrahydrofuran and 300 g of 1,3-bistrifluoromethylbenzene, to which 320 ml of 0.7M allylmagnesium bromide was added dropwise. Subsequently, 300 g (9.6×10$^{-2}$ mol) of a compound of the following formula (VI) was slowly added dropwise.

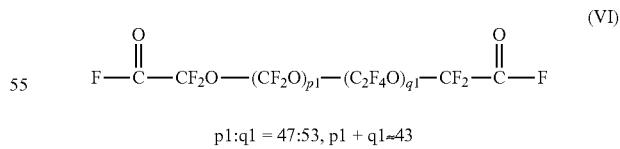

(VI)

p1:q1 = 47:53, p1 + q1 ≈ 43

The resulting solution was heated at 60° C. for 4 hours. Thereafter, it was cooled to room temperature and added dropwise to 300 g of 1.2M hydrochloric acid aqueous solution to quench the reaction. The lower layer or fluoro compound layer was recovered by separatory operation and washed with acetone. The lower layer or fluoro compound layer after washing was recovered again. The residual solvent was distilled off in vacuum, yielding 286 g of a fluoropolyether-containing polymer of the following formula (VII).

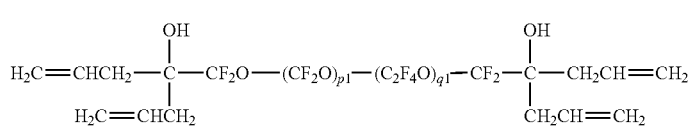

(VII)

p1:q1 = 47:53, p1 + q1 ≈ 43

Example 4

A reactor was charged with 200 g ($1.4 \times 10^{-1}$ mol) of the compound having the formula (VII) shown below, 200 g of 1,3-bistrifluoromethylbenzene, 68.4 g ($5.6 \times 10^{-1}$ mol) of trimethoxysilane, and 1.2 g of a toluene solution of chloroplatinic acid/vinylsiloxane complex (containing $3.2 \times 10^{-5}$ mol of Pt), which were mixed.

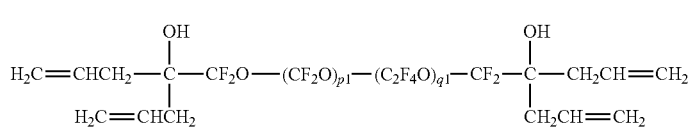

(VII)

p1:q1 = 47:53, p1 + q1 ≈ 43

The solution was aged at 80° C. for 45 hours. Thereafter, the solvent and unreacted reactants were distilled off in vacuum, obtaining 205 g of a liquid product.

On NMR analysis, the product was identified to have a structure of the following formula (VIII).

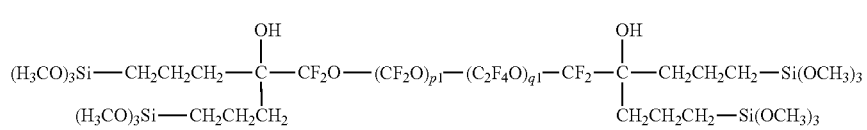

(VIII)

p1:q1 = 47:53, p1 + q1 ≈ 43

$^1$H—NMR

δ0.2 - 2.2 (—CH$_2$CH$_2$CH$_2$—) 24H

δ3.0 - 3.5 (—Si(OCH$_3$)$_3$) 36H

Comparative Example 1

The following polymer was used for comparison.

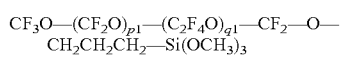

p1:q1=47:53, p1+q1≈43

Comparative Example 2

The following polymer was used for comparison.

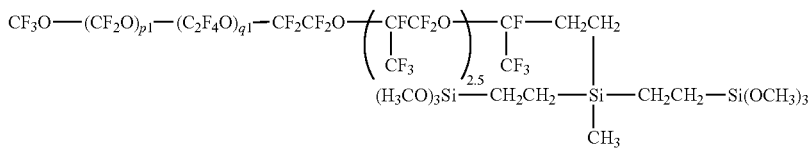

p1:q1 = 47:53, p1 + q1 ≈ 43

[Preparation of Surface Treating Agent and Formation of Cured Film]

Surface treating agents were prepared by dissolving the fluoropolyether-containing polymer-modified silanes obtained in Examples 1 to 4 and the polymers of Comparative Examples 1 and 2 in solvent Novec® 7200 (ethyl perfluorobutyl ether by 3M) in a concentration of 20 wt %. Onto glass having an outermost surface treated with $SiO_2$ of 10 nm (Gorilla® by Corning), 10 mg of each surface treating agent was deposited by vacuum evaporation at a pressure of $2.0 \times 10^{-2}$ Pa and a temperature of 700° C. The deposit was held at 80° C. in an atmosphere of humidity 80% for 12 hours or at 25° C. in an atmosphere of humidity 40% for 24 hours, obtaining a cured film of 15 nm thick.

Example 5

A surface treating agent was prepared by dissolving the fluoropolyether-containing polymer-modified silane obtained in Example 1 in solvent Novec® 7200 (ethyl perfluorobutyl ether by 3M) in a concentration of 20 wt %. The solvent used herein contained 50 ppm of water. Onto glass having an outermost surface treated with $SiO_2$ of 10 nm (Gorillas® by Corning), 10 mg of the surface treating agent was deposited by vacuum evaporation at a pressure of $2.0 \times 10^{-2}$ Pa and a temperature of 700° C. The deposit was held at 25° C. in an atmosphere of humidity 40% for 24 hours, obtaining a cured film of 15 nm thick. The film of Example 5 is a film formed using the solvent having water added thereto.

[Evaluation]

Initial Water/Oil Repellency

Using a contact angle meter Drop Master (Kyowa Interface Science Co., Ltd.), the cured film on glass was measured for a contact angle with water as an index of water repellency. Table 1 shows the results of the film resulting from curing at 80° C. and humidity 80% for 12 hours, and Table 2 shows the results of the film resulting from curing at 25° C. and humidity 40% for 24 hours. All the films showed excellent water repellency at the initial.

Weatherability

The cured film on glass was exposed to UV light (wavelength 300-400 nm) from a metal halide lamp at an irradiance of 770 $W/m^2$ for 160 hours. After this weathering, the film was measured for a contact angle with water again. Table 1 shows the results of the film resulting from curing at 80° C. and humidity 80% for 12 hours, and Table 2 shows the results of the film resulting from curing at 25° C. and humidity 40% for 24 hours.

The film of Comparative Example 1 using a polymer having an ether bond-containing linker showed a substantial drop of contact angle, indicating poor weathering resistance. The film of Comparative Example 2 using a polymer free of ether bond in the linker and free of active hydrogen showed poor weathering resistance in the case of room temperature cure.

Abrasion Resistance

Using an abrasion tester (Shinto Scientific Co., Ltd.), the film resulting from curing at 25° C. and humidity 40% for 24 hours was rubbed a multiplicity of back-and-forth strokes with steel wool. After every 1,000 strokes of rubbing, the film was measured for a contact angle with water.

Abrasion Test Conditions

| | |
|---|---|
| Atmosphere: | 25° C. and humidity 40% |
| Steel wool: | BonStar ® #0000 |
| | (Nihon SteelWool Co., Ltd.) |
| Moving distance (one way): | 30 mm |
| Moving speed: | 1,800 mm/min |
| Load: | 1 $kg/cm^2$ |

The test was terminated when the contact angle with water decreased below 100°. The count of rubbing strokes continued while a contact angle with water of at least 100° was kept was an index of abrasion resistance. The results are shown in Table 2.

The films of the treating agents of Examples having active hydrogen in the molecule exhibited satisfactory abrasion resistance even when they were cured at 25° C. and humidity 40% for 24 hours.

TABLE 1

Film cured at 80° C. and humidity 80% for 12 hours

| Surface modifier | Initial contact angle with water (°) | Contact angle with water after weathering (°) |
|---|---|---|
| Example 1 | 117 | 102 |
| Example 2 | 116 | 100 |
| Comparative Example 1 | 116 | 48 |

TABLE 2

Film cured at 25° C. and humidity 40% for 24 hours

| Surface modifier | Initial contact angle with water (°) | Contact angle with water after weathering (°) | Abrasion resistance (count) |
|---|---|---|---|
| Example 1 | 117 | 103 | 20,000 |
| Example 2 | 117 | 102 | 16,000 |
| Example 3 | 114 | 102 | 10,000 |
| Example 4 | 110 | 105 | 11,000 |

TABLE 2-continued

| | Film cured at 25° C. and humidity 40% for 24 hours | | |
|---|---|---|---|
| Surface modifier | Initial contact angle with water (°) | Contact angle with water after weathering (°) | Abrasion resistance (count) |
| Example 5 | 117 | 101 | 15,000 |
| Comparative Example 1 | 116 | 38 | 3,000 |
| Comparative Example 2 | 116 | 59 | 6,000 |

Japanese Patent Application Nos. 2014-074213 and 2014-250460 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluoropolyether-containing polymer-modified silane having the general formula (1):

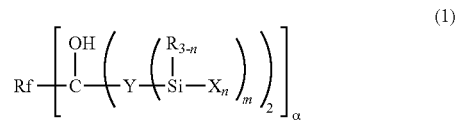

(1)

wherein Rf is a monovalent fluorooxyalkyl or divalent fluorooxyalkylene-containing polymer residue, Y is a divalent to hexavalent hydrocarbon group which may contain a siloxane bond or silylene group, R is independently an alkyl group of 1 to 4 carbon atoms or phenyl group, X is independently a hydrolyzable group, n is an integer of 1 to 3, m is an integer of 1 to 5, and α is 1 or 2.

2. The silane of claim 1 wherein α is 1, and Rf is a group having the general formula (2):

(2)

wherein p, q, r and s are each independently an integer of 0 to 200, the sum p+q+r+s is 3 to 200, each repeating unit may be linear or branched, and individual repeating units may be randomly arranged.

3. The silane of claim 1 wherein α is 2, and Rf is a group having the general formula (3):

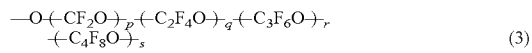

(3)

wherein p, q, r and s are each independently an integer of 0 to 200, the sum p+q+r+s is 3 to 200, each repeating unit may be linear or branched, and individual repeating units may be randomly arranged.

4. The silane of claim 1 wherein Y is selected from the group consisting of an alkylene group of 3 to 10 carbon atoms, a phenylene-containing alkylene group, a divalent group having alkylene groups bonded via a silalkylene or silarylene structure, and a divalent to tetravalent group having alkylene groups bonded to a divalent to tetravalent, linear, branched or cyclic organopolysiloxane residue of 2 to 10 silicon atoms.

5. The silane of claim 1 wherein X is selected from the group consisting of a $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

6. A surface treating agent comprising the fluoropolyether-containing polymer-modified silane of claim 1.

7. The surface treating agent of claim 6, further comprising a fluoropolyether-containing polymer having the general formula (4):

A-Rf'-A (4)  (4)

wherein A is a monovalent fluorinated group terminated with —$CF_3$ radical, and Rf' is a divalent fluorooxyalkylene-containing polymer residue.

8. An article which is surface treated with the surface treating agent of claim 6.

9. An optical article which is surface treated with the surface treating agent of claim 6.

10. A touch panel which is surface treated with the surface treating agent of claim 6.

11. An antireflective film which is surface treated with the surface treating agent of claim 6.

12. A $SiO_2$-deposited glass which is surface treated with the surface treating agent of claim 6.

13. A strengthened glass which is surface treated with the surface treating agent of claim 6.

14. A sapphire glass which is surface treated with the surface treating agent of claim 6.

15. A quartz substrate which is surface treated with the surface treating agent of claim 6.

* * * * *